United States Patent
Okita et al.

(10) Patent No.: US 8,106,955 B2
(45) Date of Patent: Jan. 31, 2012

(54) SOLID-STATE IMAGE SENSING DEVICE AND IMAGE SENSING SYSTEM

(75) Inventors: Akira Okita, Yamato (JP); Hiroki Hiyama, Zama (JP); Masaru Fujimura, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 616 days.

(21) Appl. No.: 12/102,294

(22) Filed: Apr. 14, 2008

(65) Prior Publication Data

US 2008/0273093 A1 Nov. 6, 2008

(30) Foreign Application Priority Data

May 2, 2007 (JP) ................................. 2007-121838

(51) Int. Cl.
H04N 5/225 (2006.01)
H04N 5/335 (2011.01)

(52) U.S. Cl. ..................................... 348/220.1; 348/294

(58) Field of Classification Search ............... 348/220.1, 348/211.4, 230.1, 294
See application file for complete search history.

(56) References Cited

U.S. PATENT DOCUMENTS

| | | | |
|---|---|---|---|
| 6,670,990 B1 | 12/2003 | Kochi et al. | 348/310 |
| 6,844,896 B2* | 1/2005 | Henderson et al. | 348/241 |
| 6,960,751 B2 | 11/2005 | Hiyama et al. | 250/208.1 |
| 7,110,030 B1 | 9/2006 | Kochi et al. | 348/308 |
| 7,321,110 B2 | 1/2008 | Okita et al. | 250/208.1 |
| 2002/0030749 A1 | 3/2002 | Nakamura et al. | 348/220 |
| 2003/0164887 A1 | 9/2003 | Koizumi et al. | 348/308 |
| 2006/0043440 A1 | 3/2006 | Hiyama et al. | 257/291 |
| 2006/0044439 A1 | 3/2006 | Hiyama et al. | 348/308 |
| 2006/0157759 A1 | 7/2006 | Okita et al. | 257/292 |
| 2006/0158539 A1 | 7/2006 | Koizumi et al. | 348/300 |
| 2006/0158543 A1 | 7/2006 | Ueno et al. | 348/308 |
| 2007/0069107 A1 | 3/2007 | Ishii et al. | 250/208.1 |
| 2007/0146514 A1* | 6/2007 | Maeda et al. | 348/294 |
| 2008/0024630 A1 | 1/2008 | Hiyama et al. | 348/241 |
| 2008/0055445 A1 | 3/2008 | Hatano et al. | 348/302 |
| 2008/0062295 A1 | 3/2008 | Fujimura et al. | 348/301 |
| 2008/0273093 A1* | 11/2008 | Okita et al. | 348/220.1 |

FOREIGN PATENT DOCUMENTS

| | | |
|---|---|---|
| JP | 4-177984 A | 6/1992 |
| JP | 98-83874 A | 3/1997 |
| JP | 11-266399 A | 9/1999 |
| JP | 2000-115642 A | 4/2000 |
| JP | 2001-257946 A | 9/2001 |
| JP | 2002-94862 A | 3/2002 |
| JP | 2003-134396 A | 5/2003 |
| JP | 2004-158958 A | 6/2004 |
| JP | 2005-176297 A | 6/2005 |

* cited by examiner

*Primary Examiner* — Trung Diep

(74) *Attorney, Agent, or Firm* — Fitzpatrick, Cella, Harper & Scinto

(57) ABSTRACT

A solid-state image sensing device comprises a first readout circuit configured to read out a signal from a pixel array including a plurality of pixels, a signal holding unit configured to hold the signal read out from the first readout circuit, a second readout circuit configured to read out the signal held in the signal holding unit, and a current control unit configured to control an electric current flowing through at least part of the first readout circuit while the first readout circuit reads out the signal. The current control unit controls an electric current flowing through the at least part of the first readout circuit in a moving image capturing mode to be smaller than an electric current flowing through the at least part of the first readout circuit in a still image capturing mode.

6 Claims, 10 Drawing Sheets ject of the present invention, output the amplified
SOLID-STATE IMAGE SENSING DEVICE AND IMAGE SENSING SYSTEM

BACKGROUND OF THE INVENTION

1. Field of the Invention

The present invention relates to a solid-state image sensing device and an image sensing system and, more particularly, to a solid-state image sensing device which can capture a moving image and a still image and an image sensing system having the same.

2. Description of the Related Art

A digital camera using a solid-state image sensing device which can capture both a still image and a moving image has become popular nowadays. To meet a demand for still image capturing with high image quality/high resolution, information on pixels in a number larger than that of pixels read out in moving image capturing is necessary. Although moving image capturing requires pixels fewer than those in still image capturing, a specific number of frames (e.g., 30 frames per second according to the NTSC standard) need to be recorded in one second. For this purpose, moving image capturing generally consumes a relatively large power. To cope with this, there is a method of reducing the power consumption by thinning upon reading out pixels from a solid-state image sensing device or dropping the readout clock rate in the moving image capturing mode (Japanese Patent Laid-Open No. 2004-158958).

However, the number of pixels to be read out is specified by the readout standard in moving image readout (moving image capturing), so the thinning ratio cannot deviate from the readout standard. If the clock rate is dropped in moving image readout, it is necessary to provide an oscillator for generating a still image readout clock and an oscillator for generating a moving image readout clock. It is also necessary to provide a complicated circuit to prevent any trouble upon frequency switching.

SUMMARY OF THE INVENTION

The present invention has been made in consideration of the above-described problems, and has as its object to suppress the power consumption in the moving image capturing mode without changing, e.g., the clock rate between the moving image capturing mode and the still image capturing mode.

According to the first aspect of the present invention, there is provided a solid-state image sensing device which can capture a moving image and a still image, comprising a first readout circuit configured to read out a signal from a pixel array including a plurality of pixels, a signal holding unit configured to hold the signal read out from the first readout circuit, a second readout circuit configured to read out the signal held in the signal holding unit, and a current control unit configured to control an electric current flowing through at least part of the first readout circuit while the first readout circuit reads out the signal, wherein the current control unit controls an electric current flowing through the at least part of the first readout circuit in a moving image capturing mode to be smaller than an electric current flowing through the at least part of the first readout circuit in a still image capturing mode.

According to the second aspect of the present invention, there is provided a solid-state image sensing device which can capture a moving image and a still image, comprising a pixel array including a plurality of pixels, a vertical scanning circuit configured to select a row of the pixel array, a horizontal scanning circuit configured to select a column of the pixel array, a plurality of first amplification circuits configured to amplify signals from the pixel array, a plurality of constant current sources configured to determine electric currents flowing through the plurality of first amplification circuits, a plurality of signal holding units configured to hold the signals from the plurality of first amplification circuits, a plurality of switches configured to transfer the signals, which are held in the plurality of signal holding units, in accordance with a signal sent from the horizontal scanning circuit, a second amplification circuit configured to amplify the signals transferred by the plurality of switches and output the amplified signals, and a current control unit configured to control the electric currents flowing through the plurality of constant current sources, wherein the current control unit controls an electric current flowing through each of the constant current sources in a moving image capturing mode to be smaller than an electric current flowing through each of the constant current sources in a still image capturing mode, so that each of the first amplification circuits operates with a lower driving capability in the moving image capturing mode than in the still image capturing mode.

According to the third aspect of the present invention, there is provided a solid-state image sensing device which can capture a moving image and a still image, comprising a pixel array including a plurality of pixels, a vertical scanning circuit configured to select a row of the pixel array, a horizontal scanning circuit configured to select a column of the pixel array, a plurality of column signal lines to which signals from the pixel array are output, a plurality of constant current sources each of which are connected between the ground and a corresponding one of the plurality of column signal lines, and a current control unit configured to control electric currents flowing through the plurality of constant current sources, wherein the current control unit controls an electric current flowing through each of the constant current sources in a moving image capturing mode to be smaller than an electric current flowing through each of the constant current sources in a still image capturing mode.

According to the fourth aspect of the present invention, there is provided a solid-state image sensing device which can capture a moving image and a still image, comprising a pixel array including a plurality of pixels, a vertical scanning circuit configured to select a row of the pixel array, a horizontal scanning circuit configured to select a column of the pixel array, a plurality of column signal lines to which signals from the pixel array are output, a plurality of first amplification units configured to amplify the signals output from the pixel array to the plurality of column signal lines, a plurality of signal holding units configured to hold the signals from the plurality of first amplification units, a plurality of switches configured to transfer the signals, which are held in the plurality of signal holding units, in accordance with a signal sent from the horizontal scanning circuit, a second amplification unit configured to amplify the signals transferred by the plurality of switches and output the amplified signals, a plurality of bypass routes configured to bypass the plurality of first amplification units between the plurality of column signal lines and the plurality of signal holding units, and a control unit configured to deactivate the first amplification units and bypass the first amplification units via the bypass routes in a moving image capturing mode, and to activate the first amplification units and shut off the bypass routes in a still image capturing mode.

According to the fifth aspect of the present invention, there is provided an image sensing system comprising a solid-state image sensing device as defined above, and a signal processing unit configured to process a signal output from the solid-state image sensing device.

According to the present invention, it is possible to suppress the power consumption in the moving image capturing mode without changing, e.g., the clock rate between the moving image capturing mode and the still image capturing mode.

Further features of the present invention will become apparent from the following description of exemplary embodiments with reference to the attached drawings.

DESCRIPTION OF THE EMBODIMENTS

Preferred embodiments of the present invention will be described below with reference to the accompanying drawings.

A solid-state image sensing device according to a preferred embodiment of the present invention can capture a moving image and a still image. This solid-state image sensing device can be suitably mounted in a digital camera which captures an object image as an electrical signal, and thereby records the image on a memory medium, displays the image on a display device (e.g., a liquid crystal display device), or transmits the image to other devices.

Figure 1:
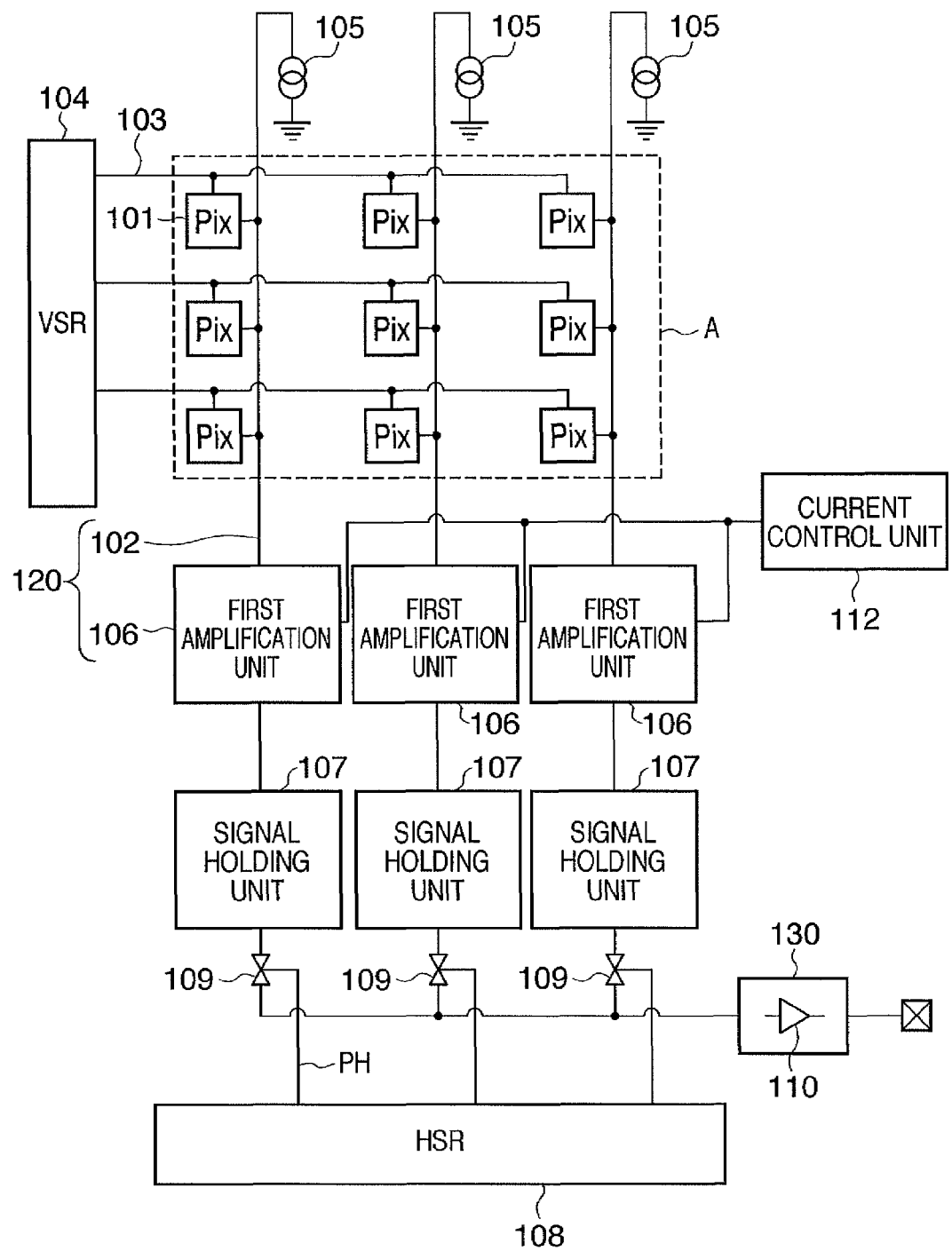
FIG. 1 is a block diagram showing the schematic arrangement of a solid-state image sensing device according to the first embodiment of the present invention.

FIG. 1 is a block diagram showing the schematic arrangement of a solid-state image sensing device according to the first embodiment of the present invention. The solid-state image sensing device comprises a pixel array A, vertical scanning circuit 104, first readout circuits (column readout circuits) 120, signal holding units 107, switches 109, horizontal scanning circuit 108, second readout circuit 130, and current control unit 112.

The pixel array A is formed by two-dimensionally arraying a plurality of pixel units 101 into a plurality of rows and a plurality of columns. For the sake of descriptive simplicity, a pixel array A is formed by 3×3 pixel units 101 in FIG. 1. However, the arrangement of the pixel array A is not particularly limited to this.

The first readout circuit 120 reads out a signal from the pixel array A, and can include, e.g., a column signal line 102, first amplification unit 106, and constant current source 105. The signal holding unit 107 holds the signal read out by the first readout circuit 120. The second readout circuit 130 reads out the signal held in the signal holding unit 107 via the switch 109, and can include, e.g., a second amplification unit 110. The first amplification unit 106 and signal holding unit 107 can be set for every other column or every plurality of columns.

The vertical scanning circuit 104 typically includes a shift register and selects a row in the pixel array A. The horizontal scanning circuit 108 typically includes a shift register and selects a column in the pixel array A. In this example, a column in the pixel array A can be selected by selectively activating the switch 109 so that the signal is transferred from the signal holding unit 107 to the second readout circuit 130.

The current control unit 112 controls an electric current flowing through at least part of the first readout circuit 120 while the first readout circuit 120 reads out the signal. The current control unit 112 controls an electric current flowing through the at least part of the first readout circuit 120 in the moving image capturing mode to be smaller than that flowing through the at least part of the first readout circuit 120 in the still image capturing mode.

In the solid-state image sensing device according to this embodiment, the second readout circuit 130 (second amplification unit 110) outputs an image signal at the same clock rate in moving image capturing and still image capturing.

Figure 2:
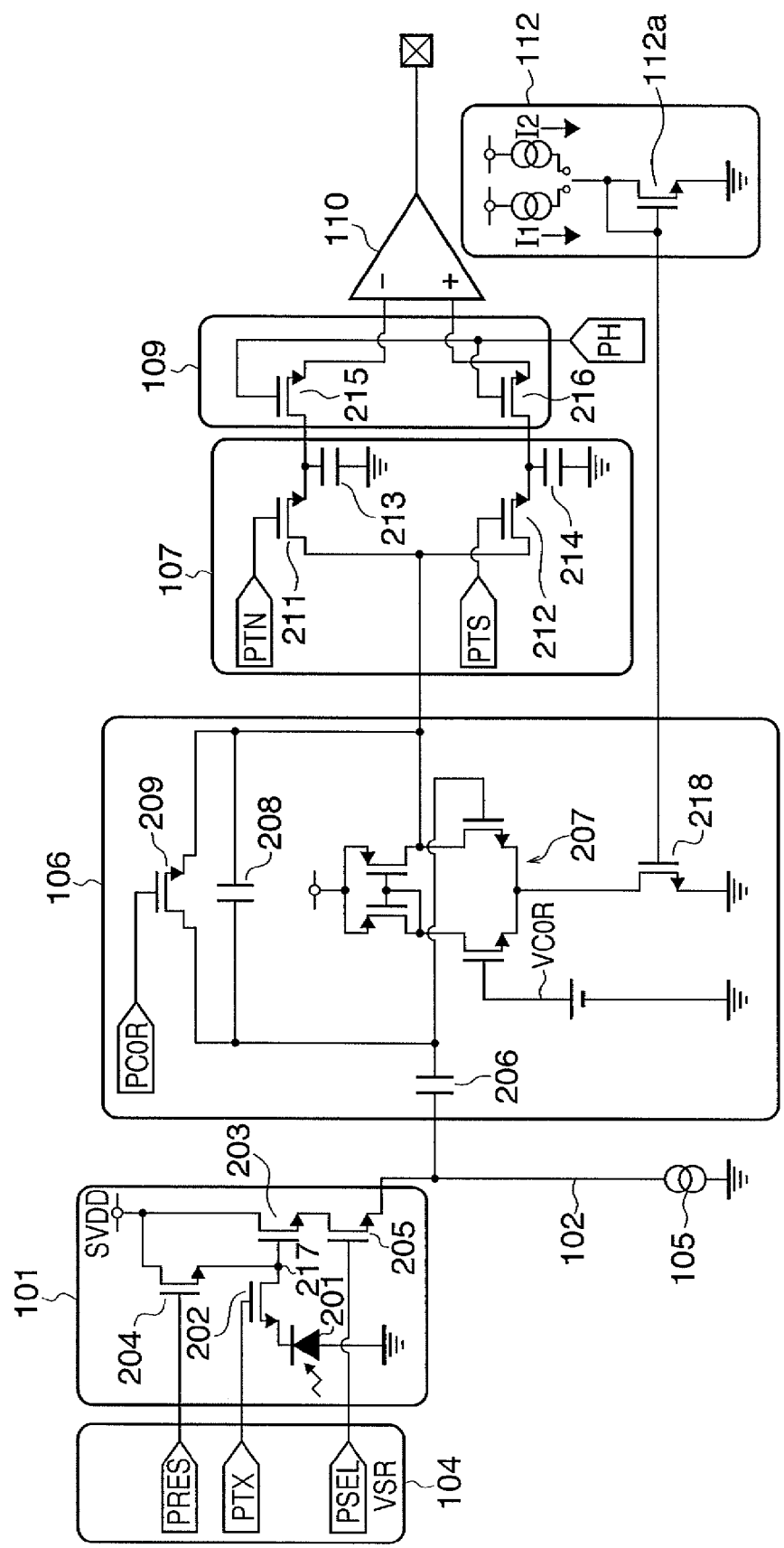
FIG. 2 is a circuit diagram illustrating an example of the detailed arrangement of the solid-state image sensing device shown in FIG. 1.
Figure 3:
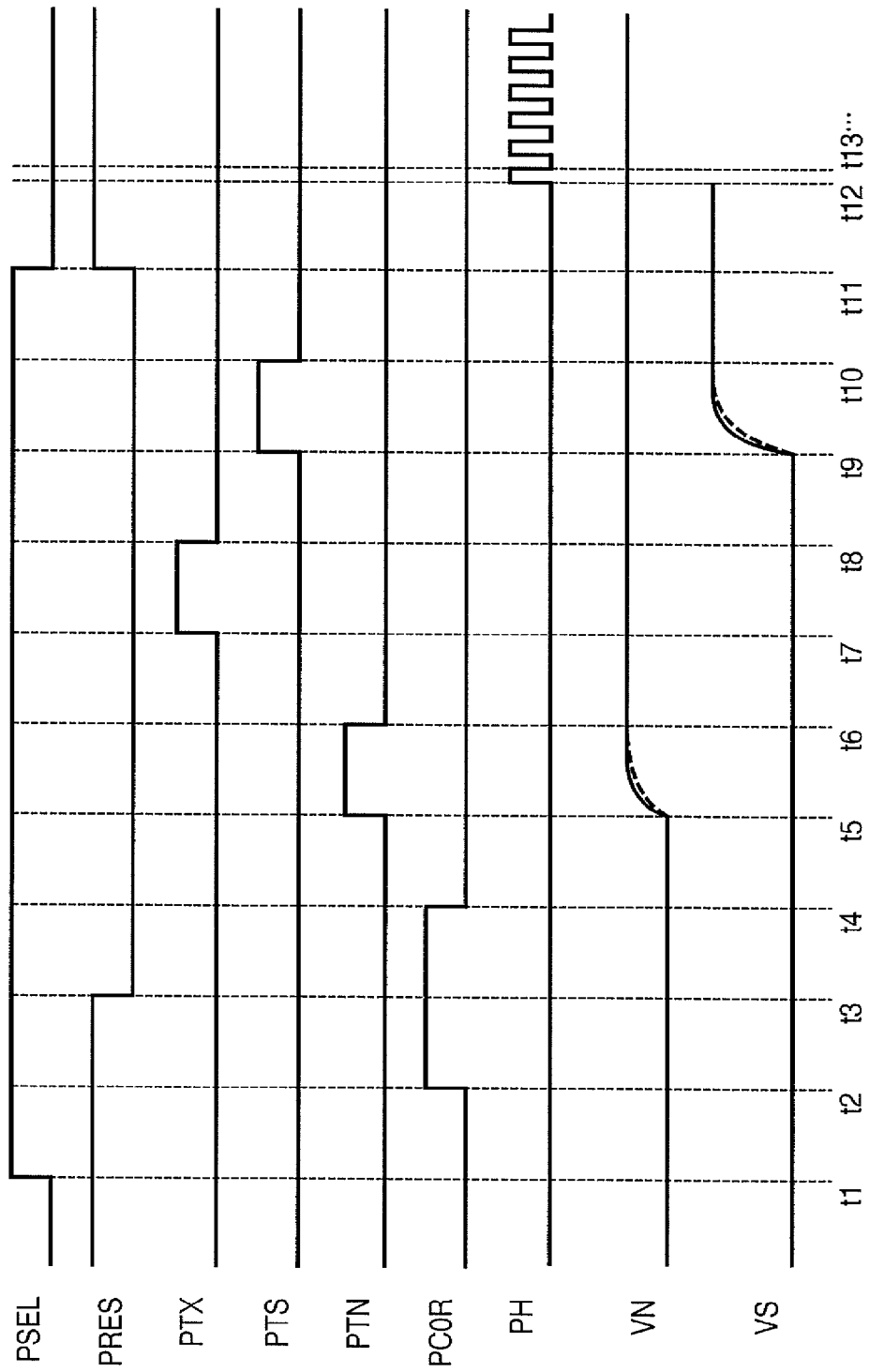
FIG. 3 is a timing chart illustrating an example of the operation of the solid-state image sensing device according to the first embodiment of the present invention.

FIG. 2 is a circuit diagram showing an example of the detailed arrangement of the pixel unit 101, first amplification unit 106 (first readout circuit 120), signal holding unit 107, and current control unit 112. FIG. 3 is a timing chart illustrating an example of the operation of the solid-state image sensing device shown in FIGS. 1 and 2.

The pixel unit 101 can include, e.g., a photodiode (photoelectric conversion unit) 201, transfer transistor 202, amplification transistor (source follower transistor) 203, reset transistor 204, and selection transistor 205. An electric charge generated by photoelectric conversion in the photodiode 201 is transferred to a floating diffusion (to be referred to as an FD hereinafter) 217 by the transfer transistor 202. The potential of the FD 217 is determined in accordance with this electric charge. The FD 217 is a node common to the gate of the amplification transistor 203. A signal based on the electric charge transferred to the FD 217 is amplified by the amplification transistor 203 and output to the column signal line 102 via the selection transistor 205. The column signal line 102 is connected to the constant current source 105 to form a source follower circuit.

The first amplification unit 106 can include, e.g., a clamp capacitance 206, inverting amplifier 207, feedback capacitance 208, and clamp switch 209. The column signal line 102 is connected to one end of the clamp capacitance 206 of the first amplification unit 106. The feedback capacitance 208 and clamp switch 209 are connected in parallel between the input end and output end of the inverting amplifier 207.

The output end of the first amplification unit 106 (first readout circuit 120) is connected to the signal holding unit 107. The signal holding unit 107 can include, e.g., switches 211 and 212 and holding capacitances 213 and 214. The holding capacitances 213 and 214 preferably have the same capacitance value. The output end of the first amplification unit 106 (first readout circuit 120) is connected to the holding capacitances 213 and 214 via the switches 211 and 212, respectively.

Signals held in the holding capacitances 213 and 214 are transferred to the second amplification unit 110 (second readout circuit 130) by turning on column selection switches 215 and 216 in accordance with a pulse PH sent from the horizontal scanning circuit 108. The holding capacitances 213 and 214 respectively hold an N output and an S output. The second amplification unit 110 amplifies the difference between the N output and the S output. This operation is called the CDS (Correlated Double Sampling) operation.

The operation of the solid-state image sensing device will be explained with reference to FIG. 3. At T=t1, a selection signal PSEL input to the gate of the selection transistor 205 changes to high level. The amplification transistor 203 is thus activated. In this state, the FD 217 is reset by a reset voltage SVDD.

At T=t2, a clamp pulse PC0R changes to high level. The inverting amplifier 207 then enters a unity gain buffer state and outputs a voltage VC0R.

At T=t3, a reset signal PRES input to the gate of the reset transistor 204 changes to low level. The potential of the FD 217 is then fixed to black signal level, and a reference voltage VN of the column signal line 102 is determined.

At T=t4, the clamp pulse PC0R changes to low level and the reference voltage VN of the column signal line 102 is clamped.

At T=t5, a pulse PTN changes to high level. The switch 211 of the signal holding unit 107 is then turned on to start writing the sum of the voltage VC0R and the offset voltage of the inverting amplifier 207 into the holding capacitance 213. At T=t6, this write is ended.

At T=t7, a transfer pulse PTX input to the gate of the transfer transistor 202 of the pixel unit 101 changes to high level. The signal charge of the photodiode 201 is then transferred to the FD 217. This transfer is completed before T=t8. At time T=t9, a pulse PTS changes to high level. The switch 212 of the signal holding unit 107 is then turned on to write a signal into the holding capacitance 214.

The potential of the column signal line 102 changes from VN to VS as the transfer pulse PTX is activated to high level. If the signal charge is an electron, VS<VN. A voltage obtained by inverting a voltage change amount (VS−VN) by a ratio (C0/Cf) between the clamp capacitance (C0) 206 and the feedback capacitance (Cf) 208, the voltage VC0R, and the offset voltage of the inverting amplifier 207 add up. The sum of these voltages is written into the holding capacitance 214 via the switch 211 of the signal holding unit 107. At T=t10, this write is ended.

At T=t11, the reset signal PRES changes to high level. The reset transistor 204 of the pixel unit 101 is then turned on to reset the ED 217. At the same time, the selection signal PSEL changes to low level to turn off the selection transistor 205. With this operation, row selection is canceled.

At T=t12, the column selection switches 215 and 216 are turned on in accordance with a pulse PH sent from the horizontal scanning circuit 108. The second amplification unit 110 calculates the difference between an N output and an S output, and outputs an image signal. At T=t13, this operation is ended and signals in the columns are sequentially output in synchronism with the pulse PH.

In this embodiment, there is no difference between the moving image capturing mode and the still image capturing mode except that the current control unit 112 controls an electric current flowing through at least part of the first readout circuit 120. For this reason, the clock rate of an image signal output from the second amplification unit 110 in synchronism with a pulse PH remains the same between the moving image capturing mode and the still image capturing mode. Normally, when this clock rate is changed between the moving image capturing mode and the still image capturing mode, a quartz oscillator needs to be switched between the moving image capturing mode and the still image capturing mode. However, this method requires a complicated frequency switching operation, resulting in an increase in the number of components.

In this embodiment, the current control unit 112 controls an electric current flowing through at least part (the first amplification unit 106 in this embodiment) of the first readout circuit 120 in the moving image capturing mode to be smaller than that flowing through the at least part of the first readout circuit 120 in the still image capturing mode.

More specifically, in this embodiment, letting I1 be the magnitude of an electric current flowing through the first amplification unit 106 in the still image capturing mode, and I2 be the magnitude of an electric current flowing through the first amplification unit 106 in the moving image capturing mode, I1>I2.

The current control unit 112 controls the gate voltage of a constant current transistor 218 of the first amplification unit 106 to control an electric current flowing through the constant current transistor 218, i.e., an electric current flowing through the first amplification unit 106. The current control unit 112 can include, e.g., a transistor 112a having its gate and drain connected to each other, and the gate of the transistor 112a can be connected to that of the constant current transistor 218. With this arrangement, the constant current transistor 218 is biased so that an electric current with the same magnitude as that of an electric current flowing through the transistor 112a flows through the constant current transistor 218. Such an arrangement is called a current mirror circuit.

The value I1 is determined such that signal voltages can be sufficiently written into the holding capacitances 213 and 214 within the period between time t9 and t10. The required write times are determined in accordance with, e.g., the capacitance values of the holding capacitances 213 and 214, the ON resistances of the switches 211 and 212, and the output impedance and inverting gain of the inverting amplifier 207. However, the driving capacity of the inverting amplifier 207 is basically changed by changing a tail current flowing through the constant current transistor 218 of the inverting amplifier 207. This makes it possible to change the times taken to write signal voltages into the holding capacitances 213 and 214.

The level at which a signal voltage is written into each of the holding capacitances 213 and 214 by consuming an infinite time is assumed to be 100%. Letting τ be a time constant, $(1-\exp(5\tau))=0.993$, i.e., 99.3% can be written for 5τ. In the still image capturing mode, the magnitude I1 of an electric current flowing through the first amplification unit 106 is determined such that a level corresponding to, e.g., 5τ is written. This makes it possible to sufficiently write signal voltages into the holding capacitances 213 and 214, thus obtaining a high-quality output image.

In the moving image capturing mode, the magnitude I2 of an electric current flowing through the first amplification unit 106 is determined such that a written signal voltage is suppressed to a level corresponding to 4τ, i.e., $(1-\exp(4\tau))=0.982$ (98.2%). In the moving image capturing mode, the output amplitude of the first amplification unit 106 decreases slightly, and sufficient voltages cannot be written into the holding capacitances 213 and 214 as an electric current flowing through the first amplification unit 106 decreases. These factors can increase noise. This, however, poses no serious problem because the allowable noise level range of a moving image to continuously view a plurality of images is wider than that of a still image.

That is, even when the written voltage in the moving image capturing mode is lower than that in the still image capturing mode, the image quality does not visually significantly deteriorate. Signal waveforms VN and VS in FIG. 3 schematically show these states. The still image capturing mode is indicated by solid lines, and the moving image capturing mode is indicated by dotted lines.

Conversely, when the current consumption is suppressed relatively small in the moving image capturing mode, the image quality improves. Setting the reference currents to satisfy I2<I1 greatly reduces the current consumption per first amplification unit 106 (e.g., per column). A digital camera which uses a total of more than 10,000,000 pixels will be taken as an example. If the number of columns exceeds 4,000 and the current consumption is reduced by 5 μA per column, the overall current consumption can be decreased by 20 mA. Assuming that the power supply voltage is 5V, the overall power consumption can be decreased by 100 mW. Heat generated by a power consumption of this amount changes the image quality significantly.

Especially when a still image is captured while capturing a moving image, or when the so-called Live View photography in which a still image is captured while the photographer views a moving image in an electronic viewfinder, the moving image capturing mode instantaneously switches to the still image capturing mode. For this reason, a still image is captured before heat generated in the moving image capturing mode dies down. This may noticeably deteriorate the quality of the still image as random noise due to the heat generated in the moving image capturing mode has a large adverse influence on still image capturing in the still image capturing mode. Suppressing the current consumption in the moving image capturing mode can therefore improve the quality of a still image.

According to this embodiment, it is also possible to smoothly switch between the moving image capturing mode and the still image capturing mode because the clock rate remains the same.

Figure 4:
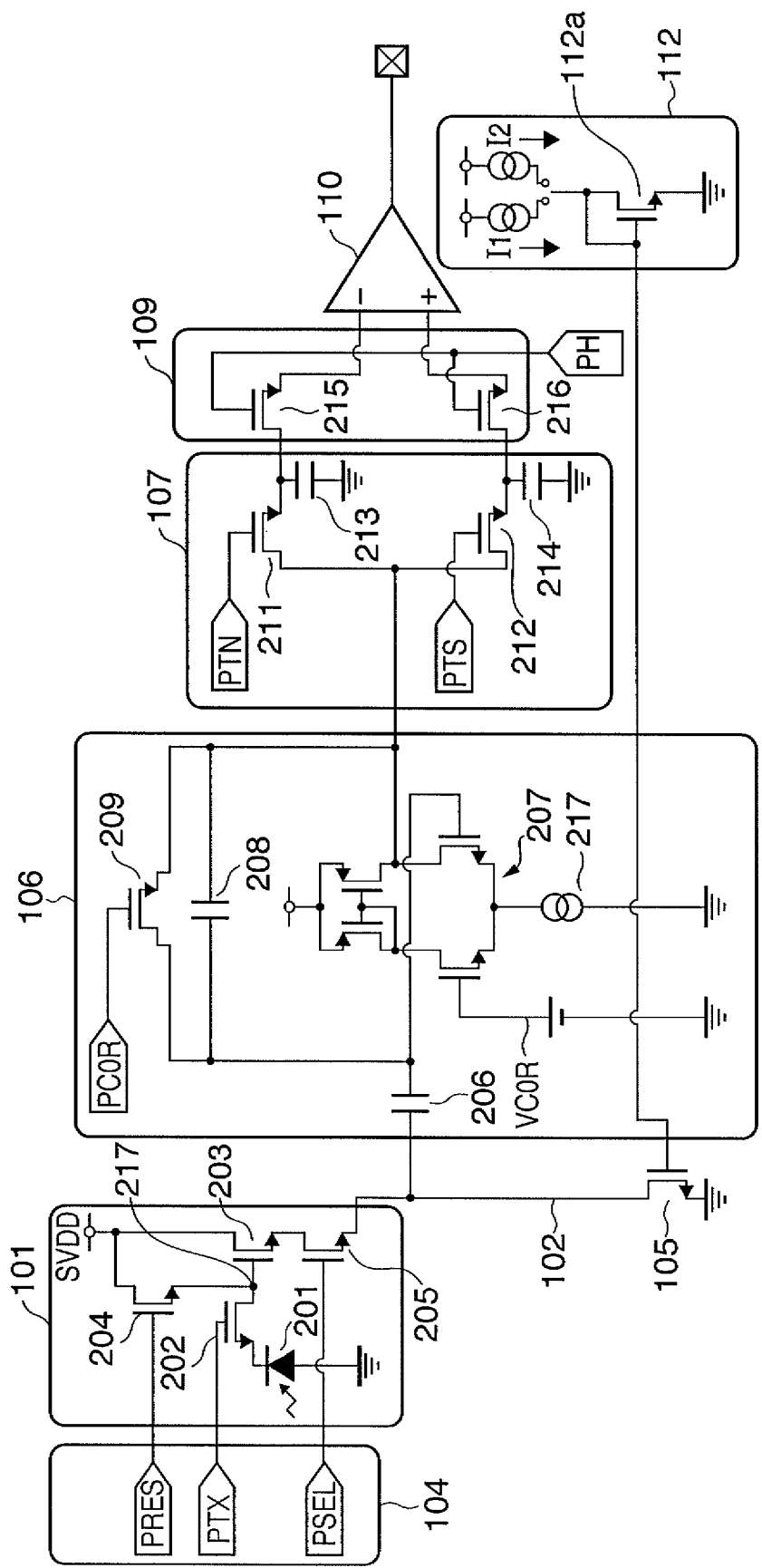
FIG. 4 is a circuit diagram showing the schematic arrangement of a solid-state image sensing device according to the second embodiment of the present invention.

FIG. 4 is a circuit diagram showing the schematic arrangement of a solid-state image sensing device according to the second embodiment of the present invention. Details which are not particularly referred to in the arrangement according to the second embodiment can be the same as in the first embodiment. The second embodiment is different from the first embodiment in that a current control unit 112 controls a constant current source 105 connected to a column signal line 102. Letting I3 be the magnitude of an electric current flowing through the constant current source 105 in the still image capturing mode, and I4 be the magnitude of an electric current flowing through the constant current source 105 in the moving image capturing mode, I3>I4.

Figure 5:
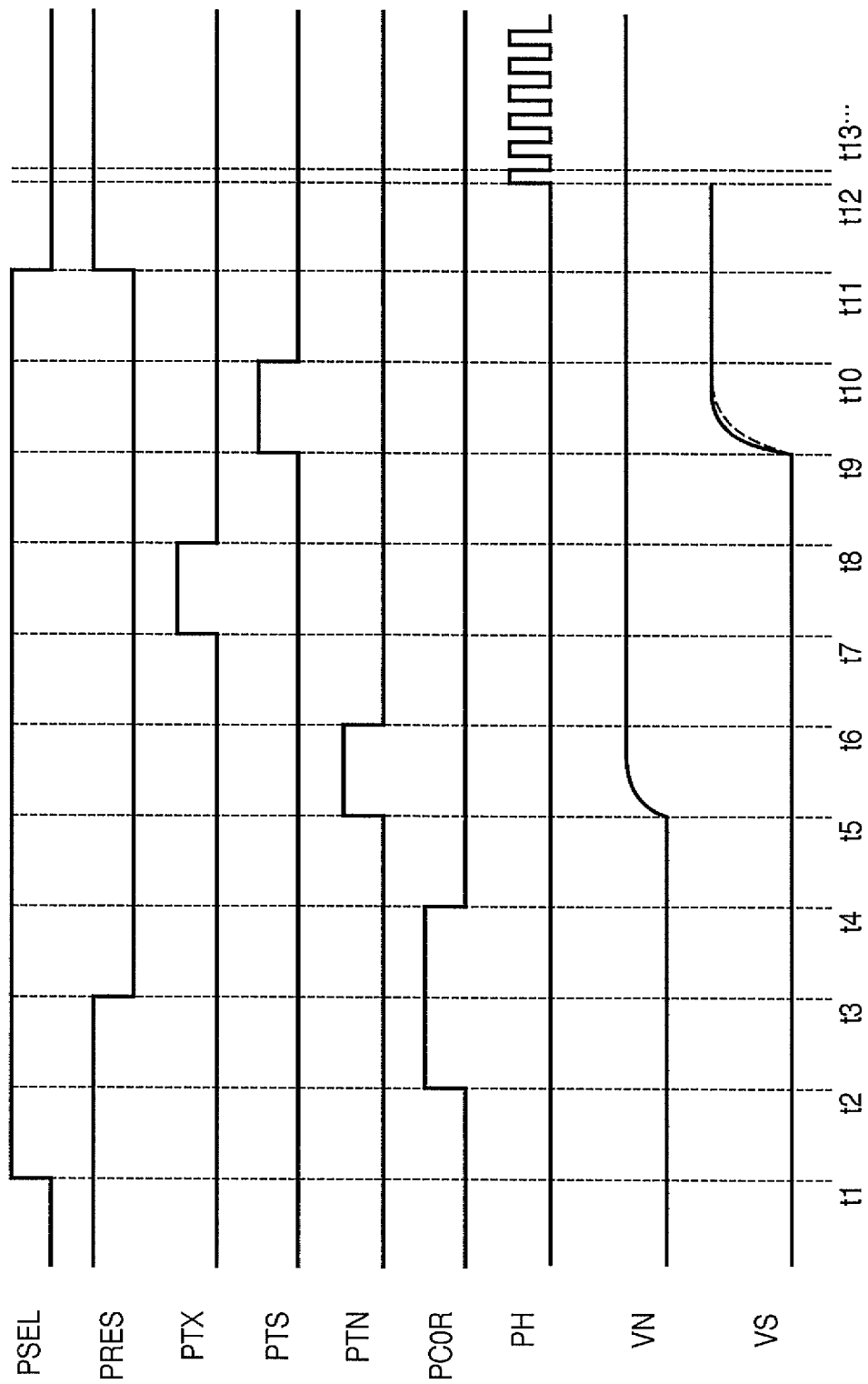
FIG. 5 is a timing chart illustrating an example of the operation of the solid-state image sensing device according to the second embodiment of the present invention.

FIG. 5 is a timing chart illustrating an example of the operation of the solid-state image sensing device according to the second embodiment. The basic operation of the solid-state image sensing device according to the second embodiment is the same as that according to the first embodiment shown in FIG. 3. The timing charts shown in FIGS. 5 and 3 are different in a change in voltage VN. In the first embodiment, the write speeds of both voltages VN and VS in the moving image capturing mode are lower than those in the still image capturing mode. In the second embodiment, an electric current flowing through the column signal line 102 in the moving image capturing mode is smaller than that in the still image capturing mode. Since a change in the voltage of the column signal line 102 is very small during the write of a voltage VN, a first amplification unit 106 determines the speed at which a voltage is written into a holding capacitance 213. This prevents a drop in write speed. In contrast, the write speed of a voltage VS in the moving image capturing mode drops, like the first embodiment, as can be seen from a change in voltage VS indicated by a dotted line in FIG. 5. This is because the charge/discharge speed of a clamp capacitance (C0) 206 drops. This, however, poses no serious problem because the allowable noise level range of a moving image to continuously view a plurality of images is wider than that of a still image, as described in the first embodiment. Like the first embodiment, suppressing the current consumption of the column signal line in the moving image capturing mode makes it possible to improve the image quality in the still image capturing mode.

The current control unit 112 may control both electric currents flowing through the first amplification unit 106 and constant current source 105 in the moving image capturing mode to be smaller than those in the still image capturing mode by combining the first and second embodiments.

Figure 6:
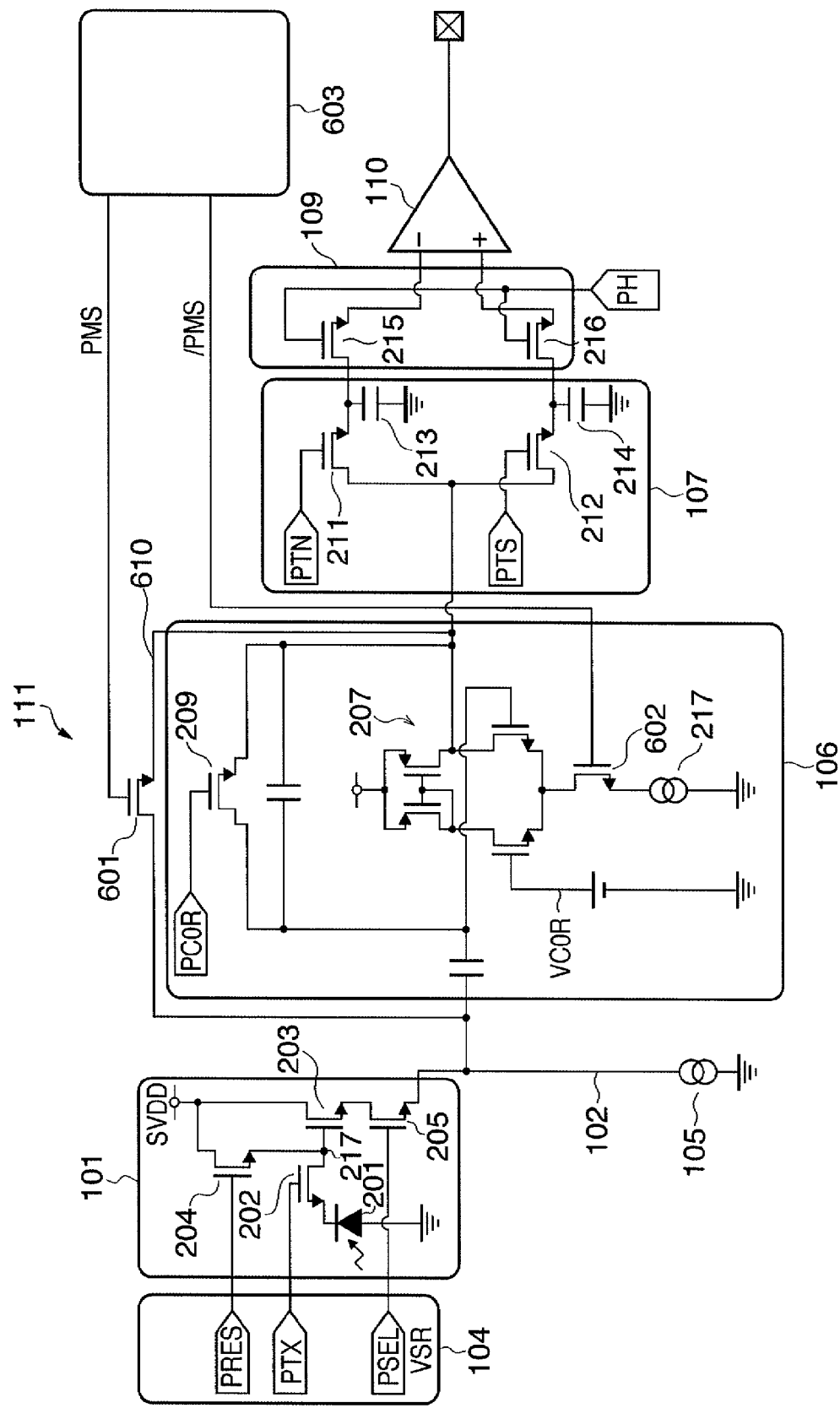
FIG. 6 is a circuit diagram showing the schematic arrangement of a solid-state image sensing device according to the third embodiment of the present invention.

FIG. 6 is a circuit diagram showing the schematic arrangement of a solid-state image sensing device according to the third embodiment of the present invention. Details which are not particularly referred to in the arrangement according to the third embodiment can be the same as in the first embodiment.

In the third embodiment, a bypass route 610 for bypassing a first amplification unit 106 is additionally connected between a column signal line 102 and a signal holding unit 107, and a transistor 602 is additionally inserted in an inverting amplifier 207. In the third embodiment, a current control unit 603 is provided in place of the current control unit 112. In the moving image capturing mode, the current control unit 603 deactivates the first amplification unit 106 and bypasses the first amplification unit 106 via the bypass route 610. In the still image capturing mode, the current control unit 603 activates the first amplification unit 106 and shuts off the bypass route 610.

The first amplification unit 106 is activated by activating the transistor 602 and deactivated by deactivating the transistor 602 under the control of the current control unit 603. The bypass route 610 is activated by activating a transistor 601 inserted in the bypass route 610, and then the first amplification unit 106 is bypassed via the bypass route 610. The bypass route 610 is shut off by deactivating the transistor 601. This operation is controlled by the current control unit 603.

Figure 7:
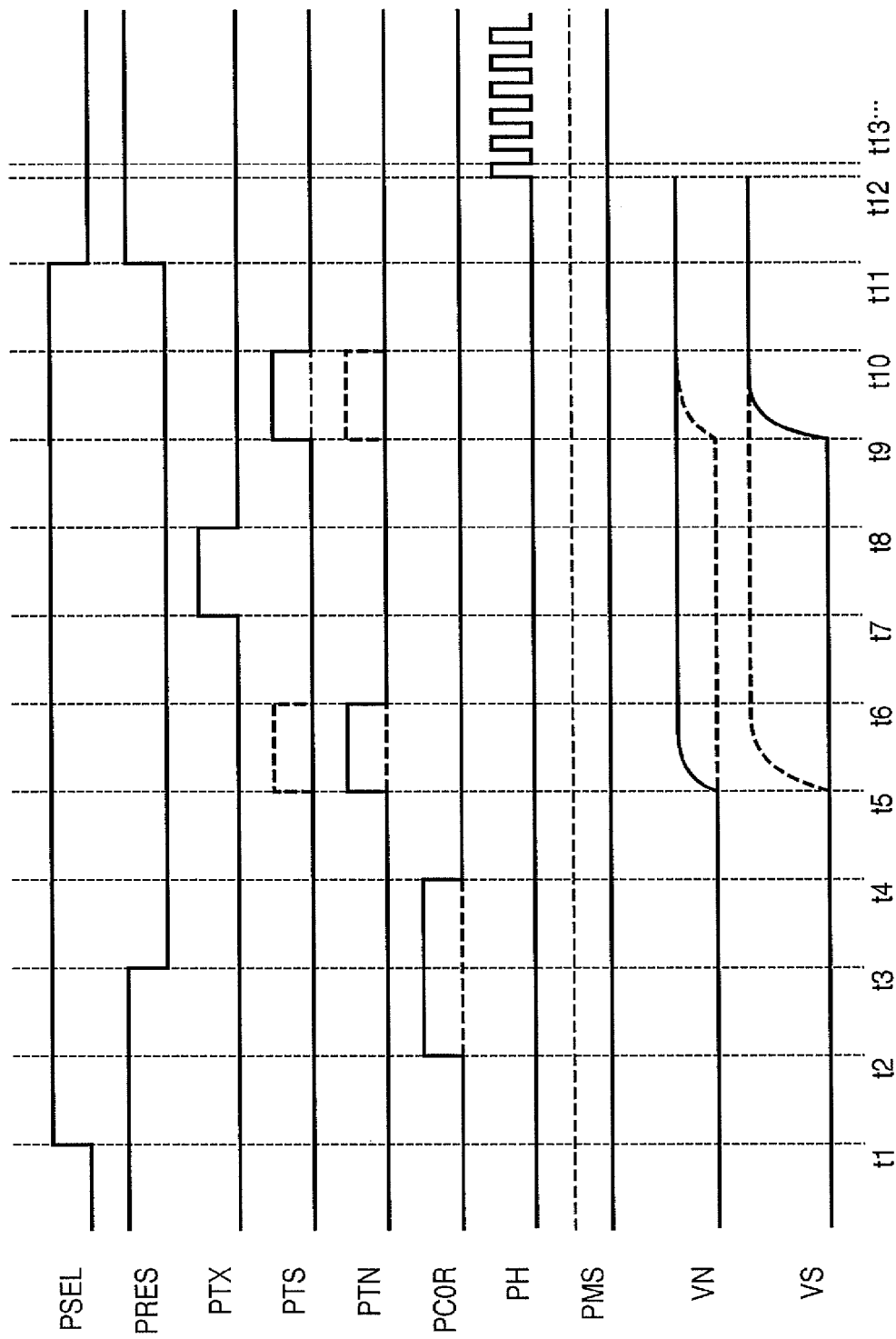
FIG. 7 is a timing chart illustrating an example of the operation of the solid-state image sensing device according to the third embodiment of the present invention.

FIG. 7 is a timing chart illustrating an example of the operation of the solid-state image sensing device according to the third embodiment. Referring to FIG. 7, the operation in the still image capturing mode is indicated by solid lines, and the operation in the moving image capturing mode is indicated by broken lines.

The basic operation of the solid-state image sensing device according to the third embodiment is the same as that according to the first embodiment shown in FIG. 3. Mode signals PMS and /PMS are generated by the current control unit 603. The mode signal /PMS is obtained by inverting the mode signal PMS. The mode signal PMS is set at low level in the still image capturing mode, while it is set at high level in the moving image capturing mode.

In the still image capturing mode, the transistor 601 which controls the bypass route 610 is OFF, while the transistor 602 which controls the activation/deactivation of the inverting amplifier 207 is ON. Therefore, in the still image capturing mode, the solid-state image sensing device shown in FIG. 6 operates in substantially the same manner as in the solid-state image sensing device shown in FIG. 2.

In the moving image capturing mode, the transistor 601 which controls the bypass route 610 is ON, while the transistor 602 which controls the activation/deactivation of the inverting amplifier 207 is OFF. Therefore, in the moving image capturing mode, no electric current flows through the inverting amplifier 207 so that the current consumption can be greatly reduced. By turning on the transistor 601, the column signal line 102 is directly connected to the signal holding unit 107. In the moving image capturing mode, since the inverting amplifier 207 is not used, a pulse PC0R is not used. Also in the moving image capturing mode, signals written into holding capacitances 213 and 214 are not inverted and amplified by the inverting amplifier 207.

An example of the operation in the moving image capturing mode will be explained below. Referring to FIG. 7, at T=t1, a selection signal PSEL input to the gate of a selection transistor 205 changes to high level. An amplification transistor 203 is thus activated. In this state, an FD 217 is reset by a reset voltage SVDD.

At T=t3, a reset signal PRES input to the gate of a reset transistor 204 changes to low level. The potential of the FD 217 is then fixed to black signal level, and a reference voltage VN of the column signal line 102 is determined.

At T=t5, a pulse PTS changes to high level. A switch 212 of the signal holding unit 107 is then turned on to start writing a reference signal VN into the holding capacitance 214. At T=t6, this write is ended. In this embodiment, a reference signal VN (N output) is written into the holding capacitance 214 and a signal VS (S output) is written into the holding capacitance 213 in the moving image capturing mode.

At T=t7, a transfer pulse PTX input to the gate of a transfer transistor 202 in a pixel unit 101 changes to high level. The signal charge of a photodiode 201 is then transferred to the FD 217. This transfer is completed before T=t8. At time T=t9, a pulse PTN changes to high level. The switch 211 of the signal holding unit 107 is then turned on to start writing a signal VS into the holding capacitance 213.

The potential of the column signal line 102 changes from VN to VS as the transfer pulse PTX is activated to high level. If the signal charge is an electron, VS<VN. The voltage value VS is directly written into the holding capacitance 213.

At T=t10, this write is ended. At T=t11, the reset signal PRES changes to high level. The reset transistor 204 of the pixel unit 101 is then turned on to reset and the FD 217. At the same time, the selection signal PSEL changes to low level to turn off the selection transistor 205. With this operation, row selection is canceled.

At T=t12, column selection switches 215 and 216 are turned on in accordance with a pulse PH sent from a horizontal scanning circuit 108. A second amplification unit 110 calculates the difference between an N output and an S output, and outputs an image signal. At T=t13, this operation is ended and signals in the columns are sequentially output in synchronism with the pulse PH.

In the third embodiment, the first amplification unit is not used in the moving image capturing mode, so the gain is relatively low. To cope with this situation, the second amplification unit 110 may multiply the image signal by a gain as needed.

According to the third embodiment, it is possible to greatly reduce the current consumption of the first amplification unit in the moving image capturing mode. On the other hand, the arrangement according to the third embodiment can be implemented by providing two switches for each first readout circuit without largely changing the circuitry.

The arrangement according to the third embodiment can be used together with that according to the second embodiment.

Figure 8:
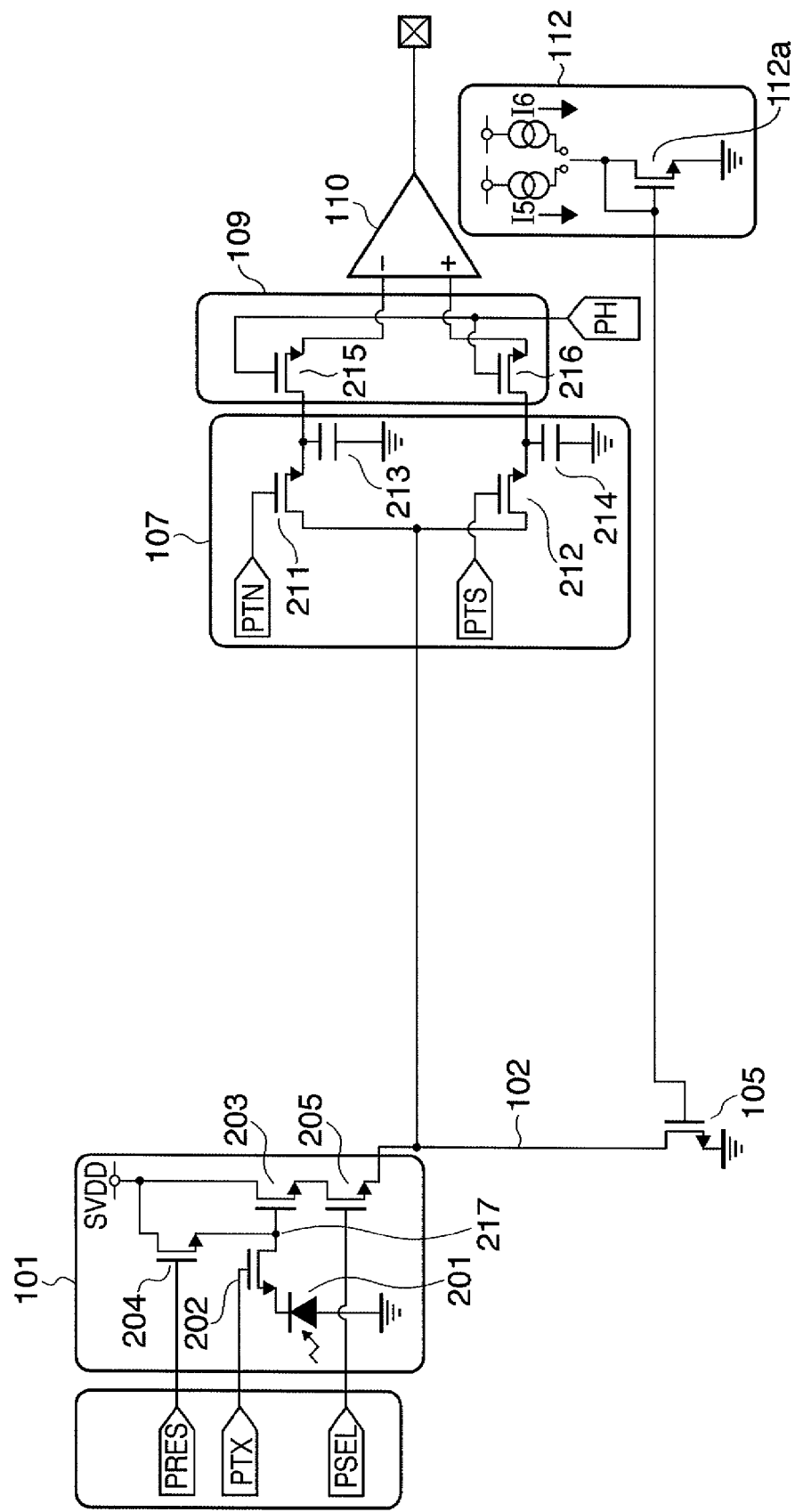
FIG. 8 is a circuit diagram showing the schematic arrangement of a solid-state image sensing device according to the fourth embodiment of the present invention.
Figure 9:
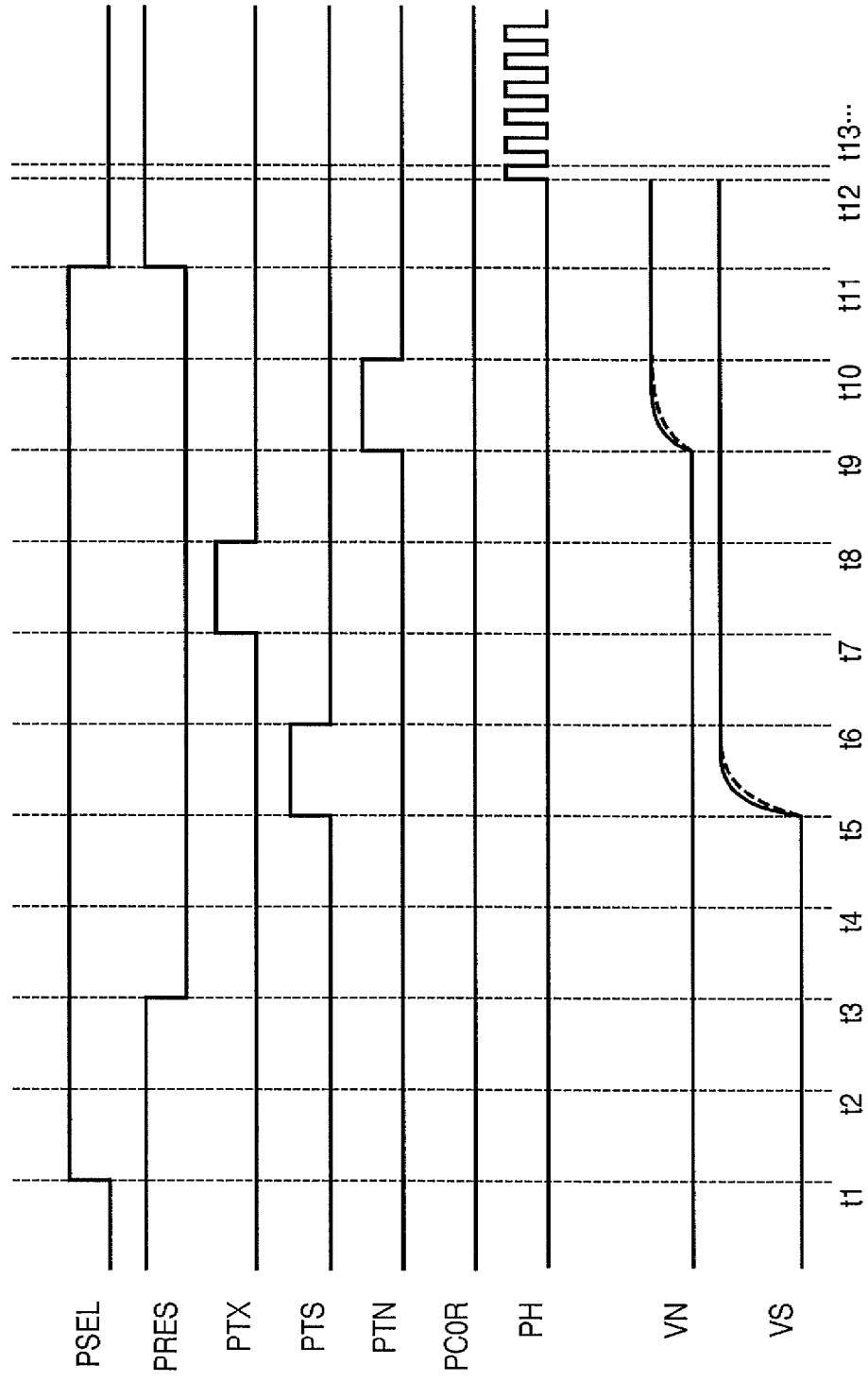
FIG. 9 is a timing chart illustrating an example of the operation of the solid-state image sensing device according to the fourth embodiment of the present invention.

FIG. 8 is a circuit diagram showing the schematic arrangement of a solid-state image sensing device according to the fourth embodiment of the present invention. FIG. 9 is a timing chart illustrating an example of the operation of the solid-state image sensing device. The fourth embodiment has an arrangement in which the first amplification unit 106 is omitted from the solid-state image sensing device according to the second embodiment shown in FIG. 4.

According to the first to fourth embodiments, it is possible to suppress the current consumption in the moving image capturing mode to be smaller than that in the still image capturing mode without changing the clock rate or readout rate between the moving image capturing mode and the still image capturing mode.

Figure 10:
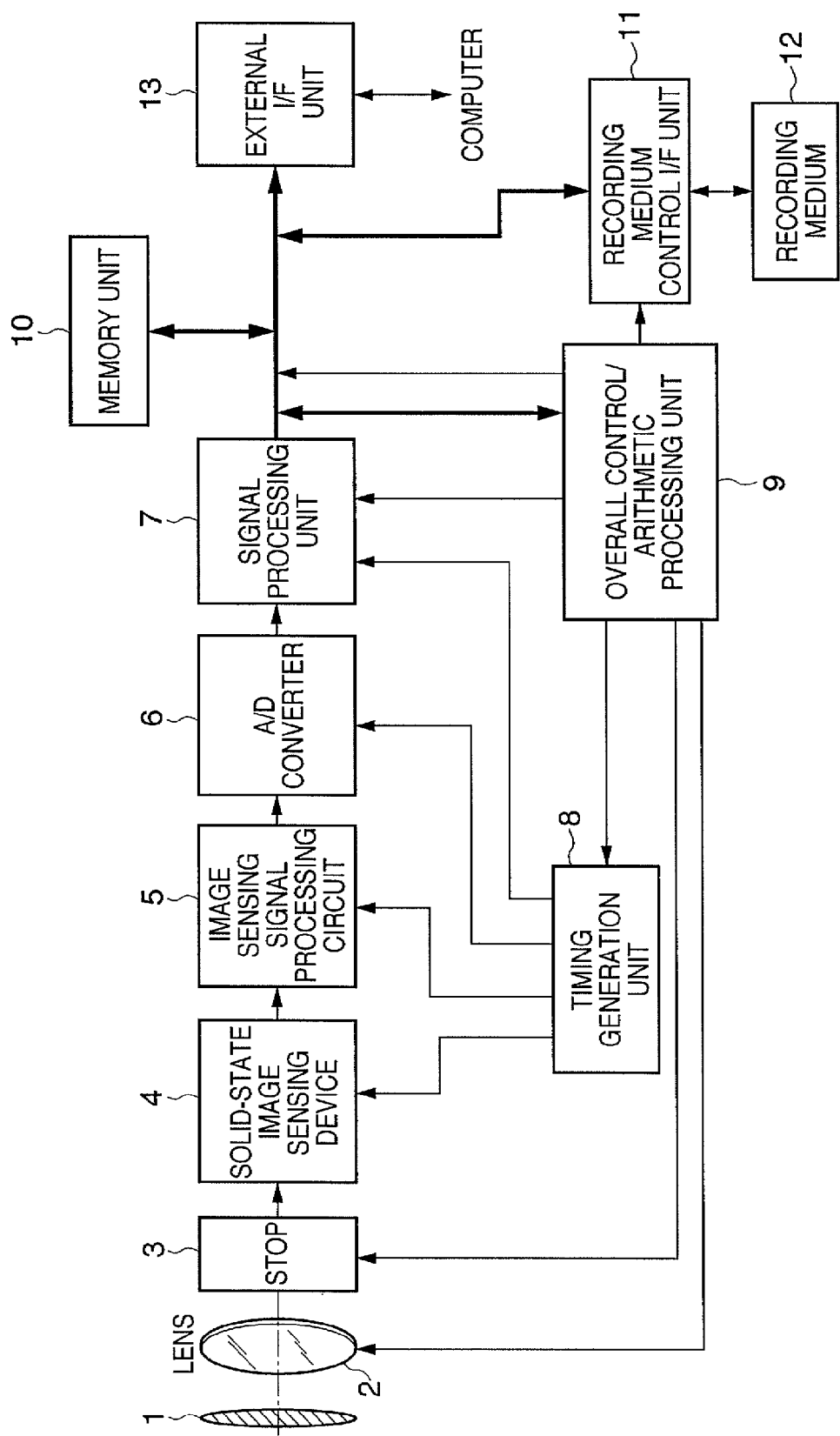
FIG. 10 is a block diagram showing the schematic configuration of an image sensing system according to a preferred embodiment of the present invention.

FIG. 10 is a block diagram showing the schematic configuration of an image sensing system according to a preferred embodiment of the present invention. This image sensing system has the solid-state image sensing device 4 according to each of the above-described first to fourth embodiments.

An optical object image is formed on the image sensing plane of a solid-state image sensing device 4 by a lens 2. A barrier 1 which serves both as a main switch and a protection of the lens 2 can be set outside the lens 2. A stop 3 for adjusting the amount of light which emerges from the lens 2 can be provided to the lens 2. Image sensing signals output from the solid-state image sensing device 4 via a plurality of channels undergo various processes such as correction and clamp by an image sensing signal processing circuit 5. The image sensing signals output from the image sensing signal processing circuit 5 via the plurality of channels are A/D-converted by an A/D converter 6. The image data output from the A/D converter 6 undergo various processes such as correction and data compression by a signal processing unit 7. The solid-state image sensing device 4, image sensing signal processing circuit 5, A/D converter 6, and signal processing unit 7 operate in accordance with timing signals generated by a timing generation unit 8.

The blocks 5 to 8 and the solid-state image sensing device 4 may be formed on the same chip. An overall control/arithmetic processing unit 9 controls the blocks of the image sensing system. In addition to these blocks, the image sensing system comprises a memory unit 10 for temporarily storing image data, and a recording medium control interface unit 11 for recording or reading out an image on or from a recording medium. A detachable recording medium 12 includes, e.g., a semiconductor memory. The image sensing system may comprise an external interface (I/F) unit 13 for communicating with, e.g., an external computer.

The operation of the image sensing system shown in FIG. 10 will be explained next. A main power supply, a power supply of a control system, and power supplies of image sensing system circuits such as the A/D converter 6 are sequentially turned on in accordance with the opening of the barrier 1. After that, the overall control/arithmetic processing unit 9 sets the stop 3 to a full-aperture state to control the exposure amount. A signal output from the solid-state image sensing device 4 is sent to the A/D converter 6 through the image sensing signal processing circuit 5. The A/D converter 6 A/D-converts the signal, and outputs the converted signal to the signal processing unit 7. The signal processing unit 7 processes the received data and sends the processed data to the overall control/arithmetic processing unit 9. The overall control/arithmetic processing unit 9 performs arithmetic exposure amount determination processing. The overall control/arithmetic processing unit 9 controls the stop 3 on the basis of the determined exposure amount.

The overall control/arithmetic processing unit 9 extracts high-frequency components from the signal which is output from the solid-state image sensing device 4 and processed by the signal processing unit 7, and calculates the distance to an object on the basis of the high-frequency components. After that, the overall control/arithmetic processing unit 9 drives the lens 2 to determine whether it is in focus. If the lens 2 is out of focus, the overall control/arithmetic processing unit 9 drives the lens 2 again, and calculates the distance.

After the lens 2 is confirmed to be in focus, final exposure is started. After the exposure is ended, an image sensing signal output from the solid-state image sensing device 4 undergoes various processes such as correction by the image sensing signal processing circuit 5, is A/D-converted by the A/D converter 6, and is processed by the signal processing unit 7. The image data processed by the signal processing unit 7 is accumulated in the memory unit 10 by the overall control/arithmetic processing unit 9.

The image data accumulated in the memory unit 10 is recorded on the recording medium 12 via the recording medium control I/F unit 11 under the control of the overall control/arithmetic processing unit 9. The image data can also be sent to, e.g., a computer via the external I/F unit 13 and processed by it.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-121838, filed May 2, 2007, which is hereby incorporated by reference herein in its entirety.

What is claimed is:

1. A solid-state image sensing device which can capture a moving image and a still image, comprising:
   a pixel array in which a plurality of pixel units are arranged to form a plurality of rows and a plurality of columns;
   a first readout circuit including a plurality of column circuits, each of which corresponds to a column of said pixel array and is constructed to read out a signal from said pixel array, wherein each of the plurality of column circuits reads out the signal from said pixel array in both a moving image capturing mode and a still image capturing mode;
   a signal holding unit constructed to hold the signals read out from said first readout circuit;
   a second readout circuit constructed to read out the signals held in said signal holding unit; and
   a current control unit constructed to control an electric current flowing through each of the plurality of column circuits while said first readout circuit reads out the signals,
   wherein said current control unit controls an electric current that is flowing through each of the plurality of column circuits during a period in which said first readout circuit reads out the signals in the moving image capturing mode to be smaller than an electric current that is flowing through each of the plurality of column circuits during a period where said first readout circuit reads out the signals in the still image capturing mode.

2. The device according to claim 1, wherein each of the plurality of column circuits includes an amplification unit.

3. A solid-state image sensing device which can capture a moving image and a still image, comprising:
   a pixel array in which a plurality of pixel units are arranged to form a plurality of rows and a plurality of columns;
   a vertical scanning circuit constructed to select a row of said pixel array;
   a horizontal scanning circuit constructed to select a column of said pixel array;
   a plurality of first amplification circuits, each of which corresponds to a column of said pixel array and is constructed to amplify signals from said pixel array, wherein each of said first amplification circuits reads out the signals from said pixel array in both a moving image capturing mode and a still image capturing mode;
   a plurality of constant current sources constructed to determine electric currents flowing through said plurality of first amplification circuits;
   a plurality of signal holding units constructed to hold the signals from said plurality of first amplification circuits;
   a plurality of switches constructed to transfer the signals, which are held in said plurality of signal holding units, in accordance with a signal sent from said horizontal scanning circuit;
   a second amplification circuit constructed to amplify the signals transferred by said plurality of switches and to output the amplified signals; and
   a current control unit constructed to control the electric currents flowing through said plurality of constant current sources,
   wherein said current control unit controls an electric current that is flowing through each of said constant current sources during a period in which said plurality of first amplification circuits amplify the signals in the moving image capturing mode to be smaller than an electric current that is flowing through each of said constant current sources during a period where each of said first amplification circuits reads out the signals in the still image capturing mode, so that each of said first amplification circuits operates with a lower driving capability in the moving image capturing mode than in the still image capturing mode.

4. The device according to claim 3, wherein each of said constant current sources includes a first transistor, and said current control unit controls the electric current by controlling a voltage of a gate of said first transistor.

5. The device according to claim 4, wherein
   said current control unit includes a second transistor having a gate and drain connected to each other, and
   a current mirror circuit is formed by connecting the gate of said first transistor of each of said constant current sources to the gate of said second transistor of said current control unit.

6. A solid-state image sensing device which can capture a moving image and a still image, comprising:
   a pixel array including a plurality of pixels;
   a vertical scanning circuit constructed to select a row of said pixel array;
   a horizontal scanning circuit constructed to select a column of said pixel array;
   a plurality of first amplification circuits constructed to amplify signals from said pixel array;
   a plurality of constant current sources constructed to determine electric currents flowing through said plurality of first amplification circuits;
   a plurality of signal holding units constructed to hold the signals from said plurality of first amplification circuits;

a plurality of switches constructed to transfer the signals, which are held in said plurality of signal holding units, in accordance with a signal sent from said horizontal scanning circuit;

a second amplification circuit constructed to amplify the signals transferred by said plurality of switches and to output the amplified signals; and a current control unit constructed to control the electric currents flowing through said plurality of constant current sources, wherein said current control unit controls an electric current flowing through each of said constant current sources in a moving image capturing mode to be smaller than an electric current flowing through each of said constant current sources in a still image capturing mode, so that each of said first amplification circuits operates with a lower driving capability in the moving image capturing mode than in the still image capturing mode, wherein each of said constant current sources includes a first transistor, and said current control unit controls the electric current by controlling a voltage of a gate of said first transistor, wherein said current control unit includes a second transistor having a gate and drain connected to each other, and a current mirror circuit is formed by connecting the gate of said first transistor of each of said constant current sources to the gate of said second transistor of said current control unit, and wherein each of said first amplification circuits comprises:

a clamp capacitance having one end constructed to receive a signal from an output line configured to output a signal from said pixel array;

an inverting amplifier having a first input terminal constructed to receive the signal held in said clamp capacitance, a second input terminal constructed to be applied with a reference voltage, and an output terminal constructed to output a difference between the reference voltage and the signal;

a feedback capacitance connected between said first input terminal and said output terminal of said inverting amplifier; and a clamp switch constructed to connect two ends of said feedback capacitance.

* * * * *